(12) United States Patent
Leinonen et al.

(10) Patent No.: US 11,481,295 B2
(45) Date of Patent: Oct. 25, 2022

(54) METHOD, AN ALL-IN-ONE TESTER AND COMPUTER PROGRAM PRODUCT

(71) Applicant: OptoFidelity Oy, Tampere (FI)

(72) Inventors: Natalia Leinonen, Tampere (FI); Petri Mantere, Tampere (FI); Kalle Ryynänen, Tampere (FI); Joni Piililä, Tampere (FI); Mika Toivakka, Tampere (FI)

(73) Assignee: OptoFidelity Oy, Tampere (FI)

( * ) Notice: Subject to any disclaimer, the term of this patent is extended or adjusted under 35 U.S.C. 154(b) by 0 days.

(21) Appl. No.: 16/484,863

(22) PCT Filed: Dec. 18, 2017

(86) PCT No.: PCT/FI2017/050905
§ 371 (c)(1),
(2) Date: Aug. 9, 2019

(87) PCT Pub. No.: WO2018/146374
PCT Pub. Date: Aug. 16, 2018

(65) Prior Publication Data
US 2020/0065205 A1 Feb. 27, 2020

Related U.S. Application Data

(60) Provisional application No. 62/457,243, filed on Feb. 10, 2017.

(51) Int. Cl.
*G06F 11/00* (2006.01)
*G06F 11/22* (2006.01)
(Continued)

(52) U.S. Cl.
CPC ...... *G06F 11/2273* (2013.01); *G06F 11/2268* (2013.01); *G06F 11/2733* (2013.01); *G06F 11/3089* (2013.01); *G06F 11/3495* (2013.01)

(58) Field of Classification Search
CPC .......... G06F 11/2221; G06F 11/3672; G06F 11/3676; G06F 11/3686; G06F 11/221;
(Continued)

(56) References Cited

U.S. PATENT DOCUMENTS 2,013,403 A * 9/1935 Cameron ............ G01M 3/3281
73/41
5,654,631 A * 8/1997 Ames ................. G01R 31/2887
324/754.16
(Continued)

FOREIGN PATENT DOCUMENTS

CN 204741458 U 11/2015
EP 1400324 A1 3/2004
(Continued)

OTHER PUBLICATIONS

Tsourveloudis et al., "Position and Suction Control of a Reconfigurable Robotic Gripper", Machine Intelligence & Robotic Control, vol. 1, No. 2, 1999, pp. 53-62 (Year: 1999).*
(Continued)

*Primary Examiner* — Michael Maskulinski
(74) *Attorney, Agent, or Firm* — Ziegler IP Law Group, LLC

(57) ABSTRACT

There are disclosed various methods, apparatuses and computer program products for a testing apparatus. In accordance with an embodiment the testing apparatus includes a frame; a gripping head for gripping a device to be tested; a first movement element for moving the gripping head with respect to the frame; a movement detector to detect at least one of a location and a position of the device; a touching element for touching the device; an imaging device for capturing images of the device; a display for generating visual information for capturing by the device; a set of sensors for examining operations of the device; a set of actuators for providing signals for reception by the device;
(Continued)

and a set of plugs adapted to be inserted into a socket of the device.

10 Claims, 7 Drawing Sheets

(51) Int. Cl.
*G06F 11/273* (2006.01)
*G06F 11/30* (2006.01)
*G06F 11/34* (2006.01)

(58) Field of Classification Search
CPC .... G06F 11/2273; G06F 11/273; H02J 50/90; G06K 9/32; G06K 9/3216; G06K 9/3233; G06T 7/70; G06T 7/73; G06T 7/74; G06T 7/75; G06T 7/80; G05B 2219/40093; G05B 2219/40243; G05B 19/402; G05B 19/41875; G05B 2219/37555; G05B 2219/37205; G05B 2219/40082; B25J 19/023; G01R 31/2832; G01R 31/2834
See application file for complete search history.

(56) References Cited

U.S. PATENT DOCUMENTS

| | | | | |
|---|---|---|---|---|
| 6,066,822 | A * | 5/2000 | Nemoto | G01R 31/2834 209/552 |
| 6,111,246 | A * | 8/2000 | Watanabe | G01R 31/2834 250/222.1 |
| 6,255,124 | B1 * | 7/2001 | Birdsley | G01R 31/2886 438/14 |
| 6,500,699 | B1 * | 12/2002 | Birdsley | G01R 31/2831 438/121 |
| 6,515,750 | B1 * | 2/2003 | Malyak | G01B 9/0209 356/512 |
| 6,812,718 | B1 * | 11/2004 | Chong | G01R 1/07342 324/754.07 |
| 7,299,451 | B2 * | 11/2007 | Dygon | G06F 11/3664 714/E11.208 |
| 9,201,763 | B1 * | 12/2015 | Hruska | G06F 11/36 |
| 9,283,672 | B1 * | 3/2016 | Matthews | G01M 99/008 |
| 2003/0046613 | A1 * | 3/2003 | Farchi | G06F 11/3676 714/38.1 |
| 2005/0278576 | A1 * | 12/2005 | Hekmatpour | G01R 31/318314 714/37 |
| 2006/0290369 | A1 * | 12/2006 | Yamashita | G01R 31/2886 324/750.2 |
| 2007/0162894 | A1 * | 7/2007 | Noller | G06F 11/3684 717/124 |
| 2007/0168734 | A1 * | 7/2007 | Vasile | G06F 11/3672 714/33 |
| 2007/0170938 | A1 * | 7/2007 | Chen | G01R 1/0466 324/750.2 |
| 2008/0296820 | A1 | 12/2008 | Bambi et al. | |
| 2009/0024874 | A1 * | 1/2009 | Proto | G06F 11/3688 714/38.14 |
| 2009/0307763 | A1 * | 12/2009 | Rawlins | G06F 11/3672 726/5 |
| 2009/0312009 | A1 | 12/2009 | Fishel | |
| 2011/0161912 | A1 * | 6/2011 | Eteminan | G06F 8/34 717/101 |
| 2011/0173496 | A1 | 7/2011 | Hosek et al. | |
| 2011/0261497 | A1 * | 10/2011 | He | H01F 7/064 361/152 |
| 2012/0029947 | A1 | 2/2012 | Wooldridge et al. | |
| 2012/0053805 | A1 * | 3/2012 | Dantu | B60W 40/09 701/70 |
| 2013/0030753 | A1 | 1/2013 | Wong et al. | |
| 2013/0158941 | A1 * | 6/2013 | Yang | G01C 21/16 702/141 |
| 2013/0236024 | A1 | 9/2013 | Kao et al. | |
| 2014/0201571 | A1 | 7/2014 | Hosek et al. | |
| 2016/0187876 | A1 | 6/2016 | Diperna et al. | |
| 2016/0301786 | A1 | 10/2016 | Koltsov et al. | |
| 2017/0024707 | A1 | 1/2017 | Yang et al. | |
| 2017/0052527 | A1 * | 2/2017 | Dougherty | G05B 19/402 |
| 2017/0276721 | A1 * | 9/2017 | Scarpella | G01B 11/02 |
| 2018/0052188 | A1 * | 2/2018 | Rowe | G01R 31/2891 |
| 2018/0089522 | A1 * | 3/2018 | Sami | G06K 19/06037 |

FOREIGN PATENT DOCUMENTS

| | | |
|---|---|---|
| WO | 2013063042 A1 | 5/2013 |
| WO | 2015059508 A1 | 4/2015 |

OTHER PUBLICATIONS

International Preliminary Report on Patentability, Application No. PCT/FI2017/050905, dated Jun. 19, 2019, 32 pages.
Written Opinion of the International Searching Authority, Application No. PCT/FI2017/050905, dated Jun. 8, 2018, 10 pages.
Written Opinion of the International Preliminary Examining Authority, Application No. PCT/FI2017/050905, dated Apr. 1, 2019, 13 pages.
International Search Report, Application No. PCT/FI201 7/050905, dated Jun. 8, 2018, 8 pages.
European Patent Office, Extended European Search Report, Application No. 178959.9, dated Dec. 1, 2020, 15 pages.

* cited by examiner

METHOD, AN ALL-IN-ONE TESTER AND COMPUTER PROGRAM PRODUCT

TECHNICAL FIELD

The aspects of the disclosed embodiments relate to a method for a testing apparatus. The aspects of the disclosed embodiments also relate to a testing apparatus for testing a device. The aspects of the disclosed embodiments further relate to computer program product for a testing apparatus.

BACKGROUND

This section is intended to provide a background or context to the aspects of the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Automated testing apparatuses for testing electronic devices, such as portable electronic devices, exist in which testing personnel puts the device to be tested on a test jig and then puts the test jig onto a test bench at a predetermined location. The testing apparatus may comprise a robotic arm which performs tests adapted for the particular device to be tested. Such tests may include touching a touch sensitive display and/or press buttons of the device. To perform such tests properly, the jig in which the device is attached, should be accurately located.

Some testing apparatuses exist which may be able to find out the correct location of the device on the test bench, wherein the testing apparatus may be able to calibrate the movements of the robotic arm accordingly.

Due to the increased properties of portable devices one testing apparatus may not be able to test all those features of the device. Therefore, a multiple of testing apparatuses may be needed at a manufacturing and/or testing site and/or at a maintenance and repair site.

SUMMARY

An aim of the present disclosure is to provide a method for a testing apparatus, a testing apparatus, and a computer program product for a testing apparatus.

Some embodiments provide a testing apparatus for testing a device. In some embodiments the testing apparatus comprises a movable and rotatable device gripping head with which a device to be tested may be attached (gripped) for testing. The testing apparatus may further comprise a set of connectors, a set of sensors and/or a set of actuators. The testing apparatus also comprises a robotic arm capable of moving and rotating the test bench.

Some embodiments provide a method and a computer program product for controlling the testing apparatus during testing a device.

Various aspects of examples of the present disclosure are provided in the detailed description.

According to a first aspect, there is provided a method for a testing apparatus, the method comprising:
attaching a device to a gripping head of the testing apparatus;
obtaining information of the device to be tested;
using the obtained information for selecting a test procedure for the device;
starting the selected test procedure;
determining the location of the device with respect to the testing apparatus;
selecting a property to be tested from a set of properties of the test procedure;
activating a testing element adapted for the selected property;
receiving a response of the device to the tested property;
analyzing the response to determine whether the tested property is properly functioning;
examining whether the set of properties comprises one or more tests not yet performed for the device; and
if so, selecting a test among the one or more tests not yet performed; and
performing the test procedure for the selected test.

According to a second aspect, there is provided a testing apparatus comprising:
a frame;
a gripping head for gripping a device to be tested;
a first movement element for moving the gripping head with respect to the frame;
a movement detector to detect at least one of a location and a position of the device;
a touching element for touching the device;
an imaging device for capturing images of the device;
a display for generating visual information for capturing by the device;
a set of sensors for examining operations of the device;
a set of actuators for providing signals for reception by the device; and
a set of plugs adapted to be inserted into a socket of the device.

According to a third aspect, there is provided a computer readable storage medium stored with code thereon for use by a testing apparatus, which when executed by a processor, causes the testing apparatus to perform:
attach a device to a gripping head of the testing apparatus;
obtain information of the device to be tested;
use the obtained information for selecting a test procedure for the device;
start the selected test procedure;
determine the location of the device with respect to the testing apparatus;
select a property to be tested from a set of properties of the test procedure;
activate a testing element adapted for the selected property;
receive a response of the device to the tested property;
analyze the response to determine whether the tested property is properly functioning;
examine whether the set of properties comprises one or more tests not yet performed for the device;
if so, select a test among the one or more tests not yet performed; and
perform the test procedure for the selected test.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF SOME EXAMPLE EMBODIMENTS

Figure 1A:
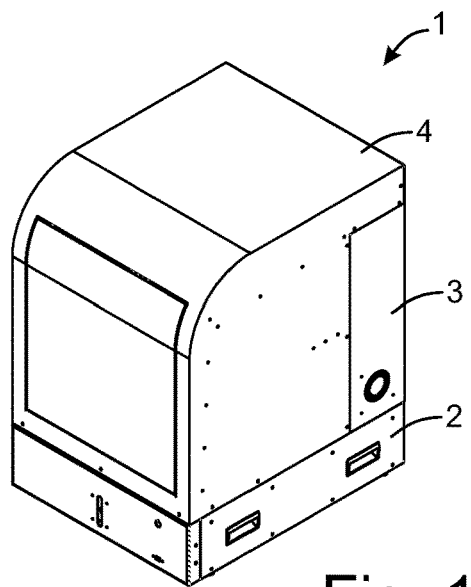
FIG. 1a depicts as a perspective view a testing apparatus according to an example embodiment.
Figure 1B:
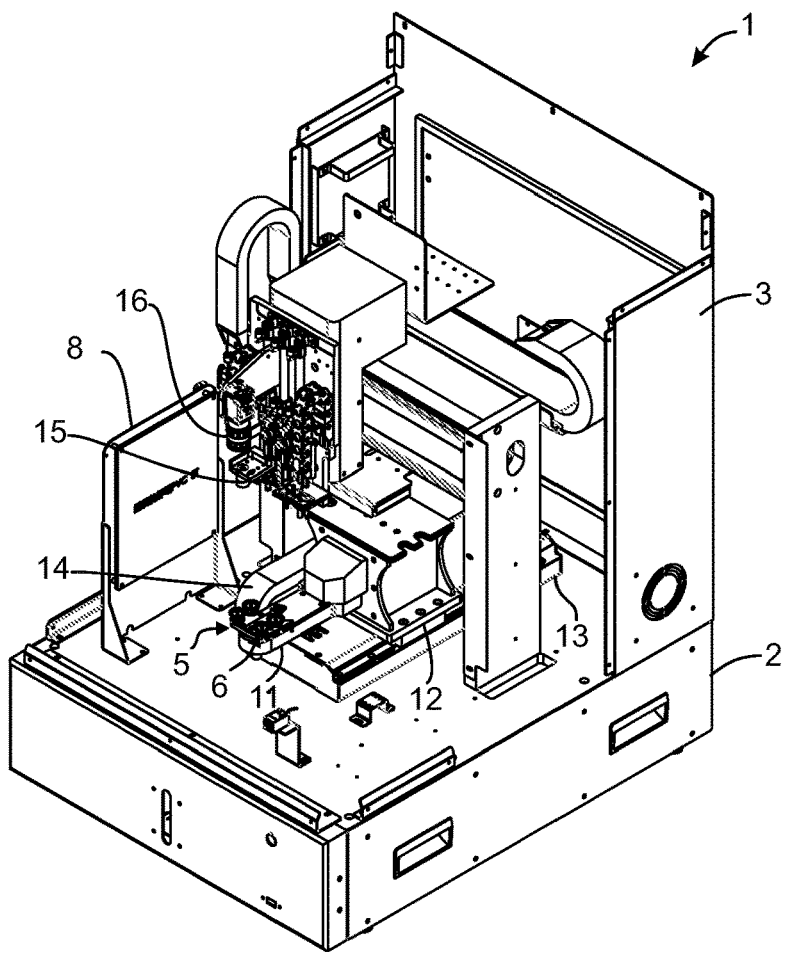
FIG. 1b depicts as a perspective view the testing apparatus of FIG. 1a a cover removed.
Figure 1C:
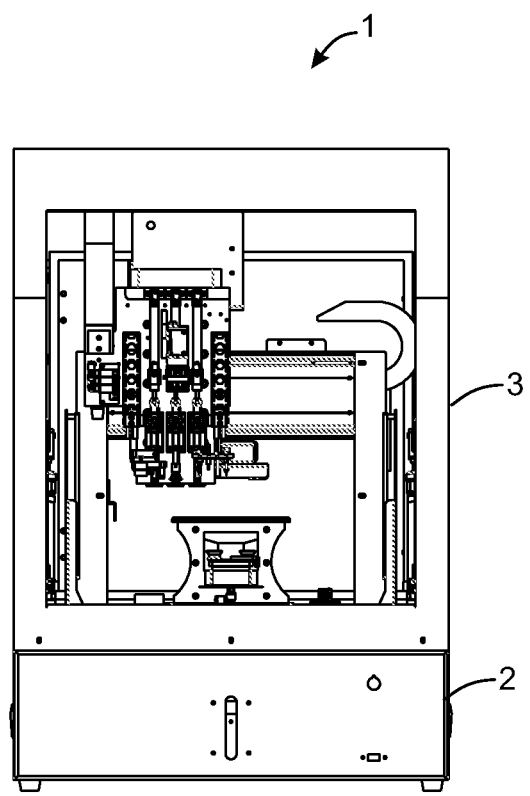
FIG. 1c as a side view the testing apparatus of FIG. 1a a cover removed.
Figure 1D:
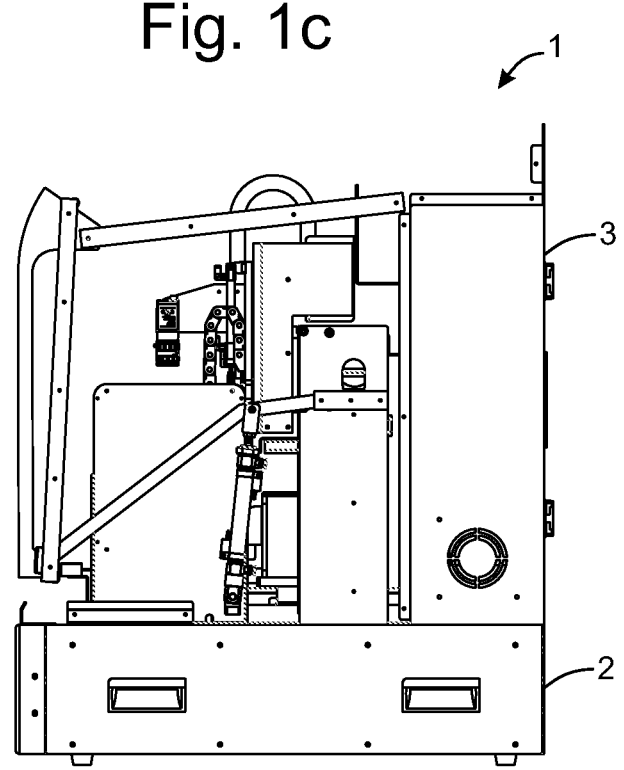
FIG. 1d as a front view the testing apparatus of FIG. 1a the cover removed.
Figure 1E:
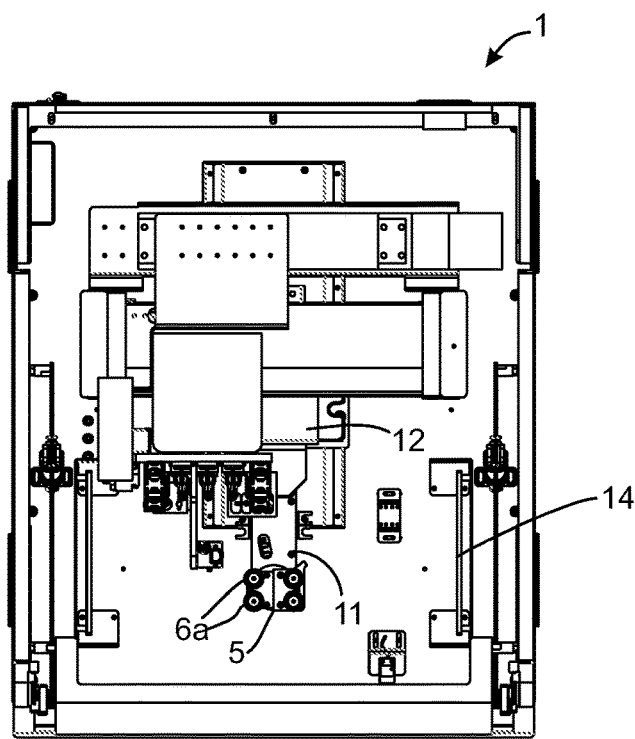
FIG. 1e as a top view the testing apparatus of FIG. 1a the cover removed.
Figure 4:
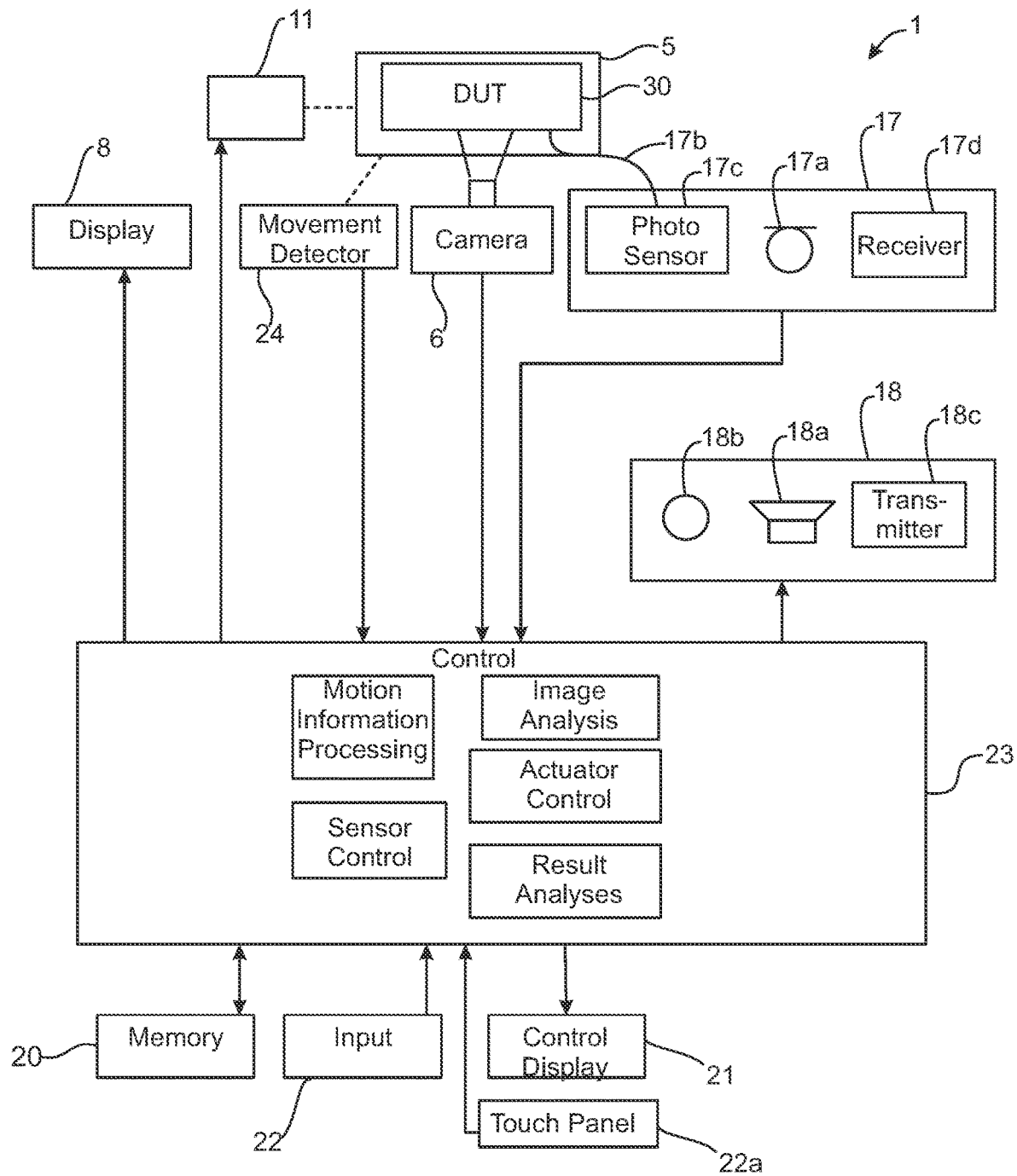
FIG. 4 shows a simplified block diagram of a testing apparatus according to an example embodiment.
Figure 5:
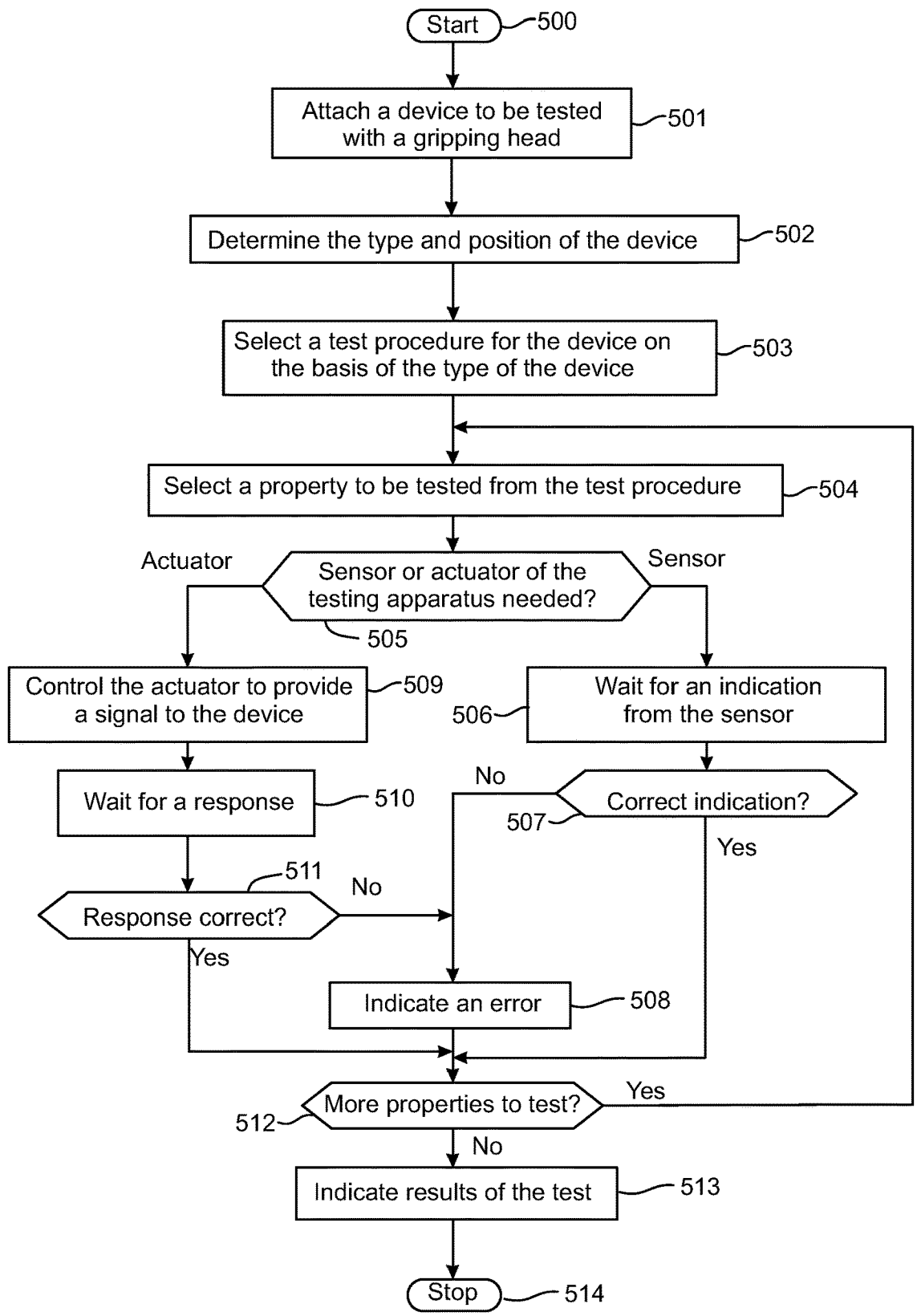
FIG. 5 is a flow diagram of a method for testing a device according to an example embodiment.

In the following some example embodiments will be described. FIG. 1a is a perspective view of a testing apparatus 1, in accordance with an embodiment, FIG. 4 is a block diagram of a circuitry of the testing apparatus 1, in accordance with an embodiment, and FIG. 5 is a flow diagram of a method 500 for testing a device according to an example embodiment. The testing apparatus 1 may also be called as an all-in-one tester due to its ability to test all or at least a majority of operations of a device 30 to be tested, as will be described later in this specification. The testing apparatus 1 has, among other things, a bottom section 2, a back section 3 and a cover 4. FIG. 1b depicts the testing apparatus 1 of FIG. 1a as a perspective view so that a cover 4 has been detached from the apparatus 1; FIG. 1c is a front view of the testing apparatus 1 of FIG. 1a, the cover 4 detached; and FIG. 1d is a top view of the testing apparatus 1 of FIG. 1a, the cover 4 detached.

The testing apparatus 1 has also a gripping head 5 with which a device 30 to be tested may be attached for testing operations. The gripping head 5 is coupled with one end of an arm 11. At another end the arm 11 may be coupled to a first movement element 12. The first movement element 12 can move the arm 11 at least horizontally, wherein also the gripping head 5 can be moved horizontally. The first movement element 12 may also rotate the arm 11, wherein also the gripping head 5 rotates. The attachment of the gripping element 5 with the arm 11 may be rotatable e.g. by a motor, wherein the gripping head 5 is rotatable at least in two orthogonal directions so that the device 30 to be tested may be set to different positions by these rotations. As an example, the device may be rotated at a main plane of the device and around a longitudinal axes of the device. In accordance with an embodiment one or both of the rotation directions may allow a full-circle rotation i.e. 360° rotation. In accordance with an embodiment one or both of the rotation directions may be smaller than a full-circle rotation i.e. less than 360° rotation. The gripping head 5 also comprises grippers 6 which may be used to fix the device 30 to be tested with the gripping head 5. The grippers 6 may be implemented in several ways but in the following only one embodiment will be described in more detail.

Figure 2A:
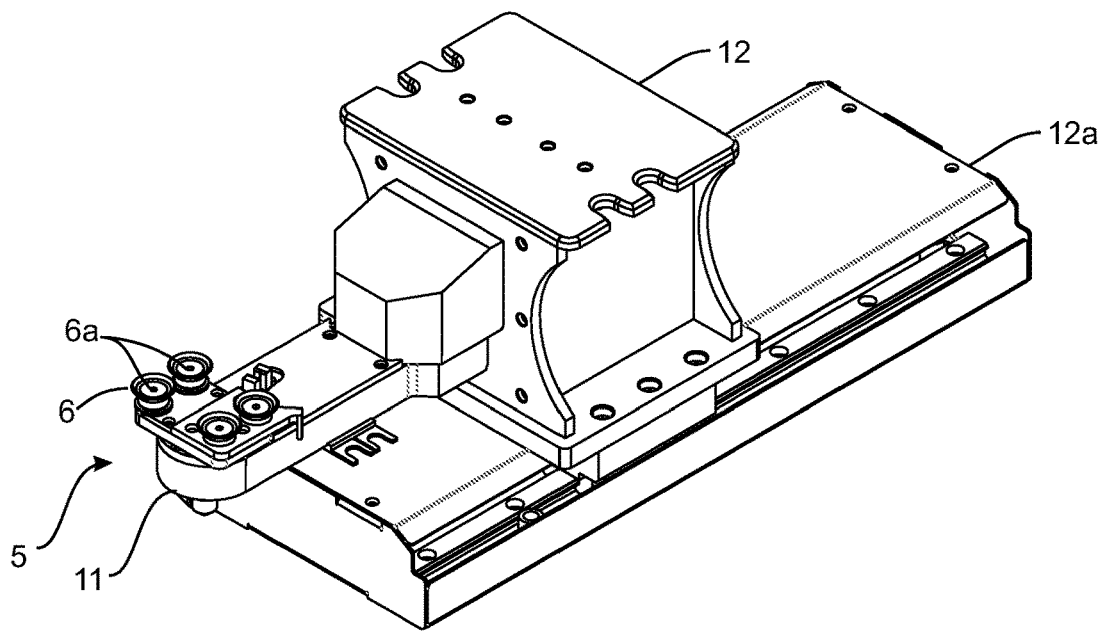
FIG. 2a illustrates a gripping head as a perspective view according to an example embodiment.
Figure 2B:
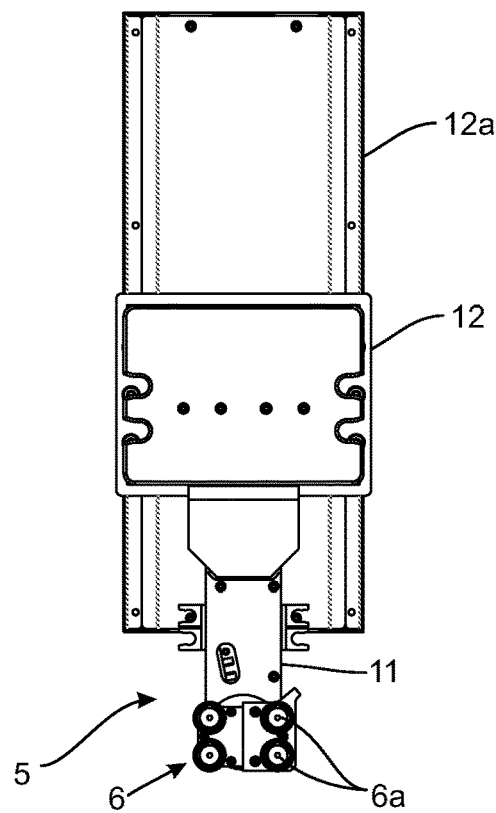
FIG. 2b illustrates a gripping head of FIG. 2a from above.
Figure 2C:
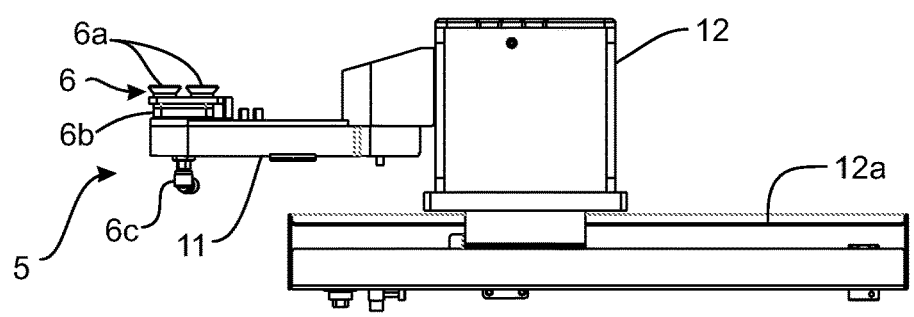
FIG. 2c illustrates the gripping head of FIG. 2a as a side view.

The full-circle rotation may be implemented e.g. so that the gripping head 5 has a motor (not shown), wherein an axle of the motor may be coupled with a base 6b either directly or via a transmission mechanism (illustrated with the reference 6c in FIG. 2c).

In accordance with an embodiment the apparatus also comprises a second movement element, which is coupled with the first movement element so that the second movement element may move the first movement element in a direction substantially perpendicular to the movement direction of the gripping head.

The gripping head 5 described above has three degrees of freedom, but in some other embodiments a smaller number of degrees of freedom may suffice, e.g. two or one degree of freedom.

FIG. 2a illustrates the gripping head 5 as a perspective view, FIG. 2b illustrates the gripping head 5 from above and FIG. 2c illustrates the gripping head 5 from one side. The grippers 6 are in this example embodiment in a form of suction inlets 6a wherein when a device is set on the gripping head 5 a suction may be provided via hoses (not shown) to induce a negative pressure (a.k.a. underpressure, low-pressure, depression) at the suction inlets 6a. This underpressure aims to draw the device towards the grippers 6 by a suction force. In accordance with an embodiment, the underpressure may be adjusted according to the weight of the device 30 to be tested to assure strong enough drawing force to the device. This kind of arrangement has inter alia the advantage that screws or other such kind of fixing elements are not needed.

The first movement element 12 may be arranged slidable or otherwise movable on a support 12a, wherein the first movement element 12 and the gripping head 5 attached with the first movement element 12 may be able to move horizontally on the support 12a providing an additional direction of movement for the gripping head 5.

Figure 3A:
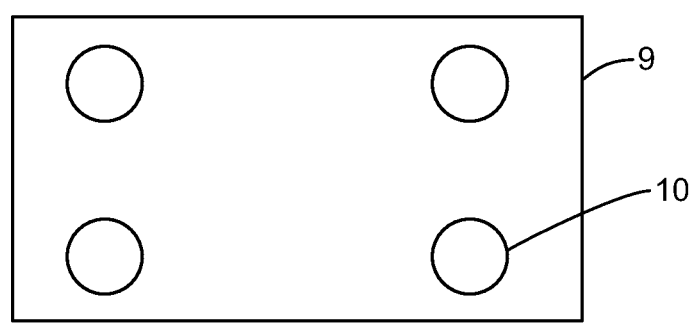
FIG. 3a illustrates an adapter from above according to an example embodiment.
Figure 3B:
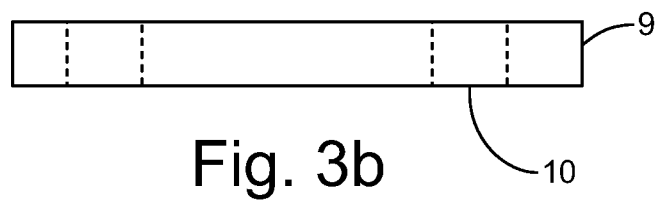
FIG. 3b illustrates the adapter of FIG. 3a as a side view.

In accordance with an embodiment, an adapter 9 may be used with the gripping head 5. An example of the adapter 9 is shown in FIGS. 3a and 3b as a top view and a side view, respectively. The adapter 9 has dips or holes 10 (e.g. through-holes) at locations which correspond with the locations of the suction inlets 6a of the gripping head 5. The adapter 9 may first be attached with the device 30 to be tested and after that put on the gripping head 5 so that the suction inlets 8 enter the holes 10. This kind of arrangement may make it easier to place the device 30 to the gripping head 5.

The first movement element 12 may be coupled with a first frame 13 in which one or more motors (not shown) may be provided for moving the first movement element 12. The motor may be, for example, a stepper motor or another kind of electric motor. A rotor axis of the motor (not shown) may be coupled to a transmission system 14 so that rotation of the rotor induces movement of the first movement element 12. There may be several different possibilities to implement the transmission system, such as a belt, a chain, cogwheels etc.

The testing apparatus 1 also comprises a touching element 15, which may also be called as a finger or a stylus, for example. The touching element 15 may be moved three-dimensionally i.e. in a vertical direction (z-direction) and in two horizontal directions (x- and y-directions). The movement in the horizontal direction may be implemented by one or two electric motors and the movement in the vertical direction may be implemented by an electric motor or a solenoid, for example. The testing apparatus 1 may comprise a movement encoder 24 or another element which is able to indicate the actual movement and/or position of the touching element 15 during the operation of the testing apparatus 1.

The testing apparatus 1 further comprises one or more imaging devices 16 such as cameras for capturing images and/or video inter alia from a display of the device 30 to be tested. One of the imaging devices 16 may be coupled to the same movement arrangement than the touching element 15 so that there is a substantially fixed offset (distance) between a tip of the touching element 15 and the imaging device 16 in the horizontal plane.

The testing apparatus 1 still comprises a set of sensors 17 for examining certain operations of the device 30 to be tested, and a set of actuators 18 for providing signals to be received and/or detected by the device 30 to be tested. The set of sensors 17 may comprise, for example, one or more microphones 17*a*, an optical fiber 17*b* in an optical coupling with a photo sensor 17*c*, a radio receiver 17*d* for short range communication (e.g. a Bluetooth™ or a near field communication (NFC) receiver), an accelerometer, a compass, a fingerprint reading sensor, a hall sensor, etc. The set of actuators 18 may comprise, for example, a loudspeaker 18*a*, a light source 18*b*, a radio transmitter 18*c* (e.g. a Bluetooth™ or a near field communication transmitter).

For testing plug-and-socket type of interfaces of the device the testing apparatus 1 may comprise different types of plugs 19 to be inserted in a corresponding socket of the device. For example, there may be a so called micro USB plug to test power inlet of the device, a headphone plug for testing the operation of a headphone interface of the device, etc.

The set of sensors 17 and/or the set of actuators 18 may have been installed into a robotic arm which may move, for example, in two substantially orthogonal directions, such as in a horizontal or a vertical plane.

There is also a display 8 for displaying images to be captured by a camera of the device 30, for example.

It should be noted that it is also possible to use another camera or an optical sensor instead of the optical fiber 17*b* and the photo sensor 17*c*. In accordance with an embodiment the optical fiber 17*b* may comprise a plurality of optical fibers i.e. a bunch of optical fibers.

The testing apparatus 1 may further comprise a memory 20 for storing data and/or computer code for operating the testing apparatus 1, a control display 21 for displaying information to a user of the testing apparatus 1, input means 22 such as a keyboard and/or a pointing device (e.g. a computer mouse) and/or a touch panel 22*a* and/or a microphone and/or some other input device for receiving instructions from the user, and a controller 23 for controlling the operation of the testing apparatus. The touch panel 22*a* and the control display 21 may be combined as a so called touch sensitive display, wherein the display may be used to show information and activation areas. When the user of the testing apparatus 1 touches the touch panel 22*a* above an activation area, the touch may be detected by the touch panel 22*a* and the location of the touch analyzed by the controller 23 to determine which operation is coupled with that activation area. These activation areas may also be called as activation buttons in this specification.

In the following the operation of the testing apparatus 1 will be described in more detail by using some examples with reference to the flow diagram of FIG. 5. These examples are not disclosing each and every possible test to be performed by the testing apparatus 1 to the device 30, but only some of them. Moreover, different devices 30 may have different kinds of properties wherein all tests which the testing apparatus 1 is able to perform may not be applicable with all devices 30.

The user may input some identification information on the device 30 to be tested (a.k.a. the device 30 in this specification) by the input means 22. The user may touch a start activation button which instructs the testing apparatus 1 to start testing the device 30. The testing apparatus 1 may then start creating the underpressure at the suction inlets 6*a*. The device 30 is then attached by the underpressure with the gripping head 5 (block 501 in FIG. 5). The testing apparatus 1 or the user of the testing apparatus 1 may start a test program in the device 30 so that the device 30 performs certain tasks, generate some signals, recognizes touches, etc. generated by the testing apparatus 1, and performs some operations as a response to detected signals, touches, etc. The testing apparatus 1 then determines 502 the location of the device 30 e.g. by capturing image or images of the device 30 and/or on the basis of location information of the gripping head 5.

To exchange information, commands, responses etc. a communication connection between the device and the testing apparatus may be created. It may be a wireless communication connection, such as a short range wireless communication connection and/or a mobile telecommunication connection, or a wired communication connection, or both.

On the basis of information of the device 30 the testing apparatus 1 may select 503 an appropriate test procedure for the device. The test procedure may comprise information of one or more properties of the device to be tested, wherein one property may be selected 504 at a time.

On the basis of information of the device 30 the testing apparatus 1 is aware of the location of a display, buttons, electric connectors (so called sockets or receptacles), microphone(s), loudspeaker(s), front camera (if any), back camera (if any), etc. of the device 30. Therefore, the testing apparatus 1 can move the device 30 and/or the set of sensors 17 and/or the set of actuators 18 and/or the plug(s) to a proper location for testing a corresponding operation of the device 30. For example, to test a power inlet of the device, the micro USB plug can be moved to the location of the power inlet (micro USB socket) and pushed into the power inlet. It may be necessary to also move the device 30 so that the micro USB plug can be located next to the power inlet and pushed into the power inlet. If the power inlet and power circuitry of the device 30 operate correctly, the test program which is run in the device 30 may provide some indication of this, e.g. by showing a certain pattern on the display and/or sending a signal via the micro USB socket which is then detected by the testing apparatus 1 and/or sending the information wirelessly e.g. by using a Bluetooth™ connection or other radio communication such as NFC. In the same way, the other socket interfaces may be tested.

In other words, if a property requiring some kind of a signal or input information by the testing apparatus 1 the testing apparatus may select 505 and control 509 an appropriate actuator and wait for a response 510 from the device 30. If the response is not correct 511, the testing apparatus 1 may indicate an error 508 and/or slightly adjust the input information.

If a property requiring some kind of a signal or output from the device 30 the testing apparatus 1 may select 505 and control an appropriate sensor and e.g. wait for an indication 506 from the sensor. If the indication is not correct 507, the testing apparatus 1 may indicate an error 508.

The test procedure may be repeated 512 until all properties to be tested have been tested. It should be noted here that indication(s) of possible errors detected during the test need not always be indicated as soon as they have been detected but the testing apparatus 1 may conduct the testing of each property first and only after that indicate the results of the test(s).

It should be noted that some property to be tested may be such that if that test fails, all or some succeeding tests cannot or should not be performed. For example, if the device cannot be powered up (e.g. a battery is empty or broken), it may not be possible to perform other tests until the power fault has been fixed.

To test an ambient light sensor of the device the testing apparatus 1 may illuminate some light by the display 8. For example, the illuminated light may be a uniform, one color light (e.g. white) or a multi-color light on the display 8. Instead of or in addition to the display 8, the illuminated light may be produced by some other element such as a back-lighted test target etc. The ambient light sensor of the device 30 may provide a value indicative of light intensity or only an on/off kind of signal indicating whether the ambient light sensor detects light or not. The brightness of the uniform light shown by the display 8 may be adjusted to determine the sensitivity of the ambient light sensor.

The microphone 17a may be used to examine the operation of the loudspeaker(s) of the device 30 e.g. by generating an audio signal by the loudspeaker(s) of the device 30 and recording it by the microphone 17a. If more than one loudspeaker will be tested, the audio signals may be generated by one loudspeaker at a time.

The microphone 17a may also be used to examine the operation of a vibration engine of the device 30. The microphone 17a may then be located so that it touches the case of the device. The vibration engine is started and the microphone 17a converts the vibration of the casing to an electric signal in the same way than when the microphone 17a converts the audio signal to an electric signal. The electric signal or an absence of the electric signal can be used to determine whether the vibration engine operates properly or not.

Camera(s) of the device 30 may be tested with the help of the display 8 of the testing apparatus 1. The device 30 may be moved to a position in which the camera to be tested (a front camera or a back camera) is viewing the display 8. A pattern or a video may be shown by the display 8 and the image/video captured by the camera may be used to determine how the camera functions.

The buttons of the device 30 may be tested by the touching element 15 of the testing apparatus 1. The touching element 15 may be moved next to a button to be tested and then the touching element 15 is pushed towards the button and drawn away from the button. The reaction of the device 30 to the press of the button is examined to determine whether the button operates or not.

The touching element 15 of the testing apparatus 1 can also be used to test the touch panel of the device 30. The touching element 15 can be put on a surface of the touch panel and slide on the surface from one location to another to determine how the touch panel reacts to sliding touches (sliding finger). Reaction of the touch panel to a touch of a finger (i.e. no sliding effect) can be performed so that the touching element 15 is first put above the touch panel at a location where an activation button is supposed to be located and then the touching element 15 is pushed towards the surface of the touch panel and retracted from the surface of the touch panel. Again, the reaction of the device 30 to the touch is examined to determine whether the device 30 functions correctly or not in this respect.

Radio communication elements (radio receiver(s) and transmitter(s)) of the device 30 can be tested by using the radio transmitter and the radio receiver of the testing apparatus 1. The transmitter of the testing apparatus 1 may generate a radio signal which may be received by the receiver of the device 30. The device 30 may provide an indication to the testing apparatus 1 if the receiver managed to receive the transmission from the transmitter of the testing apparatus 1. Correspondingly, the device 30 can be instructed to transmit radio signals by the transmitter which may then be received by the radio receiver of the testing apparatus 1, if the transmitter of the device 30 operates properly. There may be more than one radio communication equipment in the device 30 wherein different encoding/decoding and/or frequencies may need to be used.

As was already mentioned, the above described examples are only a subset of possible testing operations which the testing apparatus 1 is able to perform. This kind of testing apparatus may be called as an all-in-one tester.

In FIG. 4 some example elements are illustrated as blocks in the controller 23. Those elements, which may include one or more of a motion information processing element 25, a sensor control element 26, an image analyses element 27, an actuator control element 28 and a results analyzing element 29, may be implemented partly or wholly as a computer code to be executed by the controller 23. The motion information processing element 25 may receive motion related information of the gripping head 5 and/or the touching element 15 e.g. from the movement encoder 24, wherein the motion information processing element 25 may determine the location and position of the device 30, the location where the touching element 15 has touched the device, etc. The sensor control element 26 may control the operation of one or more sensors such as the microphone(s) 17a, the photo sensor 17c, the radio receiver 17d etc. The image analyses element 27 may examine contents of image(s) captured by the camera(s) 16 and determine, for example, how an image shown by a display of the device has changed as a response to an actuator, such as a touch on the touch screen of the device 30. The actuator control element 28 may control the operation of one or more sensors such as the loudspeaker 18a and the light source 18b etc. The results analyzing element 29 may examine results of one or more test procedures and may provide an indication how the device 30 performed the tests.

The device 30 to be tested may be a phone such as a so called smart phone or another type of a mobile phone, a tablet computer, or another portable electronic device having an appropriate user interface to be tested by the testing apparatus 1.

The testing apparatus 1 may be used in different kinds of environments/sites. For example, a phone/tablet manufacturer can use the testing apparatus 1 in the production line as a production final tester to test manufactured phones/tablets before submitting them to retail stores. Service personnel may use the testing apparatus 1 as a device care/repair center tester to test repaired devices or test second-hand devices before they are sold to another user. As an example, the testing apparatus 1 may be utilized in second-hand multimedia device refurbishment.

In the following some examples will be provided.

According to a first example, there is provided a method for a testing apparatus, the method comprising:
    attaching a device to a gripping head of the testing apparatus;

obtaining information of the device to be tested;
using the obtained information for selecting a test procedure for the device;
starting the selected test procedure;
determining the location of the device with respect to the testing apparatus;
selecting a property to be tested from a set of properties of the test procedure;
activating a testing element adapted for the selected property;
receiving a response of the device to the tested property;
analyzing the response to determine whether the tested property is properly functioning;
examining whether the set of properties comprises one or more tests not yet performed for the device; and
if so, selecting a test among the one or more tests not yet performed; and
performing the test procedure for the selected test.

In some embodiments the method comprises
determining a location of at least one of a display, one or more buttons, one or more sockets, one or more microphones, one or more loudspeakers, a front camera, a back camera of the device.

In some embodiments the method comprises
creating a communication connection between the device and the testing apparatus to enable communication between the device and the testing apparatus.

In some embodiments the method comprises:
determining a type of a socket of the device;
moving at least the gripping head so that the socket is aside of a plug of the testing apparatus; and
inserting the plug into the socket.

In some embodiments the method comprises:
determining a type of a receptacle of the device;
moving at least one of the gripping head and a plug of the testing apparatus so that the receptacle is aside of the plug;
inserting the plug into the receptacle;
providing a test signal to the plug; and
examining a response of the device to the test signal.

In some embodiments the method comprises:
comparing the response of the device to a reference response; and
if the response differs from the reference response, providing an indication that the device did not response correctly.

In some embodiments the method comprises:
searching a location of a touch panel of the device;
moving a touching element above the touch panel;
putting the touching element on a surface of the touch panel; and
retracting the touching element from the surface of the touch panel.

In some embodiments the method comprises:
sliding the touching element on the surface of the touch panel to imitate a sliding touch.

In some embodiments of the method the property of the device to be tested comprises one or more of the following:
a display of the device;
a touch panel;
a microphone;
a loudspeaker;
a camera;
a button;
a wireless communication element;
charging of a battery;
a vibration engine;
plug-and-socket type of interfaces;
an ambient light sensor;
one or more sensors of the device.

In some embodiments of the method testing one or more sensors of the device comprises:
testing an accelerometer;
testing a compass;
testing a fingerprint reading sensor;
testing a hall sensor.

In some embodiments the method comprises:
setting the device on a surface of an adapter having one or more through-holes;
setting the adapter and the device on the gripping head so that the one or more through-holes are at the location of suction inlets of the gripping head; and
generating the underpressure through the one or more through-holes.

According to a second example, there is provided a testing apparatus comprising:
a frame;
a gripping head for gripping a device to be tested;
a first movement element for moving the gripping head with respect to the frame;
a movement detector to detect at least one of a location and a position of the device;
a touching element for touching the device;
an imaging device for capturing images of the device;
a display for generating visual information for capturing by the device;
a set of sensors for examining operations of the device;
a set of actuators for providing signals for reception by the device; and
a set of plugs adapted to be inserted into a socket of the device.

In some embodiments of the apparatus:
the gripping head comprises one or more suction inlets for creating an underpressure to attach the device with the gripping head.

In some embodiments of the apparatus the set of sensors comprise at least one of:
a microphone, an optical fiber in an optical coupling with a photo sensor, a radio receiver for short range communication, an accelerometer, a compass, a fingerprint reading sensor, a hall sensor.

In some embodiments of the apparatus the set of actuators comprise at least one of:
a loudspeaker, a light source, a radio transmitter.

In some embodiments the apparatus comprises:
one or more plugs adapted to be inserted in a socket of the device for testing the interface connected with the socket.

In some embodiments the apparatus comprises:
a communication connection element for communicating with the device.

In some embodiments the apparatus comprises:
a second movement element for moving the first movement element in a direction perpendicular to the movement direction of the gripping head.

In some embodiments of the apparatus:
the gripping head comprises one or more suction inlets for creating an underpressure to attach the device with the gripping head.

According to a third example, there is provided a computer program product for testing a display capable of showing images at a first resolution, the computer program product stored on a tangible medium with code thereon for use by an apparatus, which when executed by a processor, causes the apparatus to:
 attach a device to a gripping head of the testing apparatus;
 obtain information of the device to be tested;
 use the obtained information for selecting a test procedure for the device;
 start the selected test procedure;
 determine the location of the device with respect to the testing apparatus;
 select a property to be tested from a set of properties of the test procedure;
 activate a testing element adapted for the selected property;
 receive a response of the device to the tested property;
 analyze the response to determine whether the tested property is properly functioning;
 examine whether the set of properties comprises one or more tests not yet performed for the device;
 if so, select a test among the one or more tests not yet performed; and
 perform the test procedure for the selected test.

According to a fourth example, there is provided a testing apparatus comprising:
 means for gripping a device to be tested;
 means for moving the means for gripping;
 means for detecting at least one of a location and a position of the device;
 means for touching the device;
 means for capturing images of the device;
 means for generating visual information to be captured by the device;
 means for examining operations of the device;
 means for providing signals for reception by the device; and
 means for providing electric connection with a socket of the device.

The invention claimed is:

1. A method for testing a device by a testing apparatus, the device disposed on a gripping head of the testing apparatus so that the device is at a location of suction inlets of the gripping head, the method comprising performing the following by the testing apparatus:
 generating underpressure through the suction inlets of the gripping head to draw the device towards grippers of the gripping head by a suction force;
 obtaining information of the device;
 using the obtained information for selecting a test procedure for the device;
 starting the selected test procedure;
 determining a location of the device with respect to the testing apparatus;
 determining a type of a socket of the device;
 moving at least the gripping head so that the socket is aside of a plug of the testing apparatus;
 inserting the plug into the socket;
 selecting a property to be tested from a set of properties of the test procedure;
 activating a testing element adapted for the selected property;
 receiving a response of the device to the tested property;
 analyzing the response to determine whether the tested property is properly functioning;
 examining whether the set of properties comprises one or more tests not yet performed for the device; and
 if so, selecting a test among the one or more tests not yet performed; and
 performing the test procedure for the selected test.

2. The method according to claim 1 comprising:
 determining by the testing apparatus a location of at least one of a display, one or more buttons, one or more sockets, one or more microphones, one or more loudspeakers, a front camera, a back camera of the device.

3. The method according to claim 1 comprising:
 creating a communication connection between the device and the testing apparatus to enable communication between the device and the testing apparatus.

4. The method according to claim 1 comprising:
 determining a type of a receptacle of the device;
 moving at least one of the gripping head and a plug of the testing apparatus so that the receptacle is aside of the plug;
 inserting the plug into the receptacle;
 providing a test signal to the plug; and
 examining a response of the device to the test signal.

5. The method according to claim 1 comprising:
 comparing the response of the device to a reference response; and
 if the response differs from the reference response, providing an indication that the device did not respond correctly.

6. The method according to claim 1 comprising:
 searching a location of a touch panel of the device;
 moving a touching element above the touch panel;
 putting the touching element on a surface of the touch panel; and
 retracting the touching element from the surface of the touch panel.

7. The method according to claim 1 comprising:
 sliding the touching element on the surface of the touch panel to imitate a sliding touch.

8. The method according to claim 1, wherein the property of the device to be tested comprises one or more of the following:
 a display of the device;
 a touch panel;
 a microphone;
 a loudspeaker;
 a camera;
 a button;
 a wireless communication element;
 charging of a battery;
 a vibration engine;
 plug-and-socket type of interfaces;
 an ambient light sensor;
 one or more sensors of the device.

9. The method according to claim 1, wherein testing one or more sensors of the device comprises:
 testing an accelerometer;
 testing a compass;
 testing a fingerprint reading sensor;
 testing a hall sensor.

10. A computer program product comprising a non-transitory machine-readable storage medium with machine readable instructions configured to enable an apparatus to test a device disposed on a gripping head of the testing apparatus so that the device is at a location of suction inlets of the gripping head, the machine readable instruction, when executed by a processor, causing the apparatus to:
 generate underpressure through the suction inlets;
 obtain information of the device;
 use the obtained information for selecting a test procedure for the device;

start the selected test procedure;
determine a location of the device with respect to the testing apparatus;
determine a type of a socket of the device;
move at least the gripping head so that the socket is aside of a plug of the testing apparatus;
insert the plug into the socket;
select a property to be tested from a set of properties of the test procedure;
activate a testing element adapted for the selected property;
receive a response of the device to the tested property;
analyze the response to determine whether the tested property is properly functioning;
examine whether the set of properties comprises one or more tests not yet performed for the device;
if so, select a test among the one or more tests not yet performed; and perform the test procedure for the selected test.

\* \* \* \* \*